(12) United States Patent
Sekimura et al.

(10) Patent No.: US 9,138,915 B2
(45) Date of Patent: Sep. 22, 2015

(54) METHOD FOR PRODUCING RESIN COMPOSITION

(75) Inventors: Satoshi Sekimura, Higashiyamato (JP); Hiroshi Harada, Tsukuba (JP); Koichi Mizumoto, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 381 days.

(21) Appl. No.: 13/604,843

(22) Filed: Sep. 6, 2012

(65) Prior Publication Data
US 2013/0079454 A1 Mar. 28, 2013

(30) Foreign Application Priority Data

Sep. 27, 2011 (JP) ................................. 2011-210454

(51) Int. Cl.
| | |
|---|---|
| *C08L 67/04* | (2006.01) |
| *C08K 7/14* | (2006.01) |
| *C08J 3/20* | (2006.01) |
| *B29C 47/10* | (2006.01) |
| *B29C 47/92* | (2006.01) |
| *B29B 7/48* | (2006.01) |
| *B29B 7/72* | (2006.01) |
| *B29C 47/60* | (2006.01) |
| *B29C 47/38* | (2006.01) |
| *B29C 47/00* | (2006.01) |
| *B29C 47/76* | (2006.01) |
| *B29K 105/12* | (2006.01) |
| *B29K 105/16* | (2006.01) |

(52) U.S. Cl.
CPC ................. *B29B 7/482* (2013.01); *B29B 7/726* (2013.01); *B29C 47/38* (2013.01); *B29C 47/6056* (2013.01); *B29C 47/92* (2013.01); *C08J 3/203* (2013.01); *B29C 47/0004* (2013.01); *B29C 47/1045* (2013.01); *B29C 47/1063* (2013.01); *B29C 47/1081* (2013.01); *B29C 47/6025* (2013.01); *B29C 47/767* (2013.01); *B29C 2947/92704* (2013.01); *B29C 2947/92895* (2013.01); *B29K 2105/12* (2013.01); *B29K 2105/16* (2013.01); *C08J 2367/03* (2013.01)

(58) Field of Classification Search
CPC ............ C08L 67/04; C08K 7/14; C08J 3/203; B29C 47/92; B29C 47/1081
USPC ............................ 524/494; 523/351; 349/183
See application file for complete search history.

(56) References Cited

U.S. PATENT DOCUMENTS

| | | | |
|---|---|---|---|
| 6,346,568 B1 * | 2/2002 | Maeda et al. ................. 524/495 |
| 2010/0053972 A1 * | 3/2010 | Nakayama ............... 362/296.01 |
| 2010/0327728 A1 * | 12/2010 | Saito et al. .................... 313/113 |

FOREIGN PATENT DOCUMENTS

JP           06-240114 A       8/1994

* cited by examiner

*Primary Examiner* — Ling Choi
*Assistant Examiner* — Ronald Grinsted
(74) *Attorney, Agent, or Firm* — Panitch Schwarze Belisario & Nadel LLP

(57) ABSTRACT

A method is provided for producing a resin composition in which the fiber length of the fibrous filler contained in the resin composition is controlled. The method includes a step of feeding a resin (A) and a fibrous filler (B) to an extruder, melt-kneading and then extruding them. The extruder includes a cylinder, a screw mounted in the cylinder, a main feed port provided in the cylinder, and a side feed port provided rearwards from the main feed port in the extrusion direction. Part of the resin (A) and part of a fibrous filler (B) having a weight-average fiber length of not less than 1 mm are fed through the main feed port and the rest of the resin (A) and the rest of the fibrous filler (B) having a weight-average fiber length of not less than 1 mm are fed through the side feed port.

4 Claims, 1 Drawing Sheet

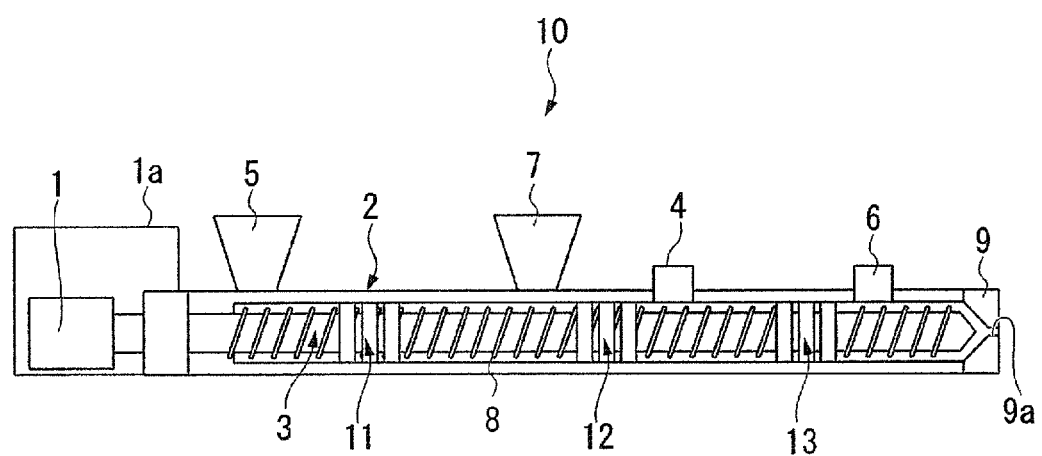

METHOD FOR PRODUCING RESIN COMPOSITION

BACKGROUND OF THE INVENTION

1. Field of the Invention

The present invention relates to a method for producing a resin composition containing a fibrous filler.

2. Description of the Related Art

Liquid crystalline polyesters have been used as materials of electric and electronic components and optical components because they are good in molding proccessability, have high heat resistance and strength, and are superior in electric insulation property.

Liquid crystalline polyesters are characteristics in that when molded, molecular chains thereof are easily oriented along the flow direction and therefore anisotropy in mold shrinkage and mechanical properties between the flow direction and the perpendicular direction is easily occur. For this reason, they have been used with incorporation of fillers of various forms such as a fibrous form and a tabular form for reducing anisotropy.

In blending a fibrous filler to a liquid crystalline polyester, the average fiber length of the filler is desired to be controlled in order to obtain desired flowability or moldability and desired strength of molded articles.

In JP-A-6-240114, a flow length in injection molding and a shrinkage of a molded article have been determined by injection molding a pellet prepared from a glass fiber-reinforced liquid crystalline resin composition comprising (A) 100 parts by weight of at least one liquid crystalline resin selected from liquid crystalline polyester resins capable of forming an anisotropic molten phase and liquid crystalline polyesteramide resins and (B) 5 to 300 parts by weight of glass fiber having an average fiber diameter of 3 to 15 μm, wherein the weight average fiber length in the composition pellet is within the range of 0.02 to 0.55 mm, the proportion of glass fiber being larger than 1 mm in fiber length is 0 to 15% by weight of the whole glass fiber, and the proportion of glass fiber being up to 0.1 mm in fiber length is 0 to 50% by weight of the whole glass fiber. This technology, however, is not a technology to control the weight ratio or the average fiber length in filling of glass fiber.

Moreover, the incorporation of a fibrous filler uniformized beforehand in average fiber length makes it possible to control the average fiber length of the filler in the liquid crystalline polyester composition, but it requires classification of the fibrous filler according to fiber length before the incorporation, so that it takes time and cost.

SUMMARY OF THE INVENTION

The present invention was devised in light of the above-described circumstances and it attempts to provide a method for producing a resin composition in which the fiber length of a fibrous filler contained in the resin composition is controlled. It also attempts to provide a method by which a resin composition in which the fiber length of a fibrous filler contained in the resin composition is controlled can be produced economically.

The present invention is a method for producing a resin composition, the method comprising a step of feeding a resin (A) and a fibrous filler (B) to an extruder, melt-kneading and then extruding them, wherein in the extruder comprising a cylinder, a screw mounted in the cylinder, a main feed port provided in the cylinder, and a side feed port provided rearwards from the main feed port in the extrusion direction, part of the resin (A) and part of a fibrous filler (B) having a weight-average fiber length of not less than 1 mm are fed through the main feed port and the rest of the resin (A) and the rest of the fibrous filler (B) having a weight-average fiber length of not less than 1 mm are fed through the side feed port.

Preferably, in the present invention, the amount of the resin (A) fed to the extruder is 80 to 55% by weight and the amount of the fibrous filler (B) fed to the extruder is 20 to 45% by weight where the sum total of the resin (A) and the fibrous filler (B) is considered to be 100% by weight.

Preferably, $X1/X2=55/45$ to $70/30$ $(X1+X2=100)$, $Y1/Y2=75/25$ to $25/75$ $(Y1+Y2=100)$, and $X2/Y2=90/10$ to $45/55$ $(X2+Y2=100)$ where the amount of the part of the resin (A) to be fed to the main feed port is represented by $X1$, the amount of the part of the fibrous filler (B) to be fed to the main feed port is represented by $Y1$, the amount of the rest of the resin (A) to be fed to the side feed port is represented by $X2$, the amount of the rest of the fibrous filler (B) to be fed to the side feed port is represented by $Y2$, and $X1+X2+Y1+Y2=100\%$ by weight.

In the present invention, the resin (A) is preferably a liquid crystalline polyester.

In the present invention, the fibrous filler (B) is preferably an inorganic filler selected from the group consisting of a glass fiber, a carbon fiber, a basalt fiber, and an alumina fiber.

According to the present invention, it is possible to economically produce a resin composition in which the fiber length of the fibrous filler contained in the resin composition is controlled.

BRIEF DESCRIPTION OF THE DRAWINGS

FIG. 1 is a schematic sectional view illustrating one example of extruders that can be used for the present invention.

DETAILED DESCRIPTION OF THE PREFERRED EMBODIMENTS

Embodiments of the method for producing a resin composition of the present invention are described below with reference to the accompanying drawings.

The extruder to be used in the present invention is not restricted to the extruder depicted in FIG. 1, but it is preferably an extruder comprising a cylinder, one or more screws mounted within the cylinder, and two or more feed ports (main feed port and side feed port) provided in the cylinder, and more preferably an extruder provided with one or more vent in the cylinder.

Examples of the extruder to be used in the present invention include a single-screw extruder and a twin-screw extruder. Examples of such a twin screw extruder include co-rotating single- to three-thread screw extruders, a counter-rotating parallel axis type extruder, and an inclined axis type or incompletely engaging type extruder. Particularly, a co-rotating twin-screw extruder is preferred.

The extruder 10 shown in FIG. 1 has a motor 1 housed in a motor box 1a, a cylinder 2 disposed adjacent to the motor box 1a, and a screw 3 inserted into the cylinder 2 and connected to the motor 1. The extruder 10 depicted in FIG. 1 is a twin-screw extruder in which two screws 3 have been inserted into the cylinder 2.

The cylinder 2 is provided with a main feed port 5 through which a resin (A) and a fibrous filler (B) are to be fed into the cylinder 2, a side feed port 7 through which a resin (A) and a fibrous filler (B) are to be fed into the cylinder 2 at a position located rearwards (downstream) from the main feed port 5 in the extrusion direction, a first vent 4 and a second vent 6 through which a volatile component (gas) generated within the cylinder 2 is to be exhausted, and an outlet die 9 through which a melt-kneaded resin composition (mixture of the resin (A) and the fibrous filler (B)) is formed.

The cylinder 2 is provided with the main feed port 5 at the most upstream position (the position located by the motor box 1) and are provided with the side feed port 7, the first vent 4, and the second vent 6 in that order toward the downstream side (rearwards in the extrusion direction; on the side of the die 9) from the main feed port 5, and is provided with the outlet die 9 having a nozzle hole 9a interconnected to the cylinder 2, at the downstream end of the cylinder 2.

The main feed port 5 and the side feed port 7 each have a hopper connected to the inside of the cylinder 2 and a feeder which feeds the resin (A) and the fibrous filler (B) in a fixed mass or a fixed volume. Examples of the feeding system of the feeder include a belt system, a screw system, a vibration system, and a table system.

Examples of the system of the first vent 4 and the second vent 6 include an open vent system opened to the air, and a vacuum vent system in which vacuum is maintained with connection to a pump such as a water seal pump, a rotary pump, an oil diffusion pump, and a turbo pump.

The screw 3 has a conveying section 8 for conveying a resin composition; has, between the main feed port 5 and the side feed port 7, a first kneading section 11 for plasticizing and kneading a resin composition; has, between the side feed port 7 and the first vent 4, a second kneading section 12 for plasticizing and kneading a resin composition; and has, between the first vent 4 and the second vent 6, a third kneading section 13 for kneading a resin composition. Moreover, it may further have a fourth kneading section and a fifth kneading section at the first vent 4 and the second vent 6. In this embodiment, it is preferred to control the cylinder temperature sufficiently in order to suppress shear heating.

The screw 3 is constituted by combining screw elements. Generally, the conveying section 8 is constituted by a positive flight (full flight) screw element, and the first kneading section 11, the second kneading section 12, and the third kneading section 13 are constituted by such screw elements as full flight, reverse flight, seal ring, positive kneading disc, neutral kneading disc, and reverse kneading disc, in combination.

Preferably, the elements of the first kneading section 11 and the second kneading section 12 each use an element with a configuration in which kneading discs are superposed with the kneading discs staggered at a phase angle being greater than 0 and less than 90 degrees, and a neutral kneading element (a configuration with kneading discs staggered at a phase angle of 90 degrees).

Preferably, a neutral kneading element is used for the third kneading section 13.

When the screw 3 further has a kneading section located rearwards in the extrusion direction (downstream) from the third kneading section 13, it is preferred to use a neutral kneading element for the kneading section located at the most downstream and use an element with a configuration in which kneading discs are superposed with the kneading discs staggered at a phase angle being greater than 0 and less than 90 degrees and a neutral kneading element for the kneading sections other than the kneading section of the most downstream. For example, when the screw 3 further has a fourth kneading section and a fifth kneading section at the first vent 4 and the second vent 6, it is preferred to use an element with a configuration in which kneading discs are superposed with the kneading discs staggered at a phase angle being greater than 0 and less than 90 degrees and a neutral kneading element as the elements of the first to fourth kneading sections and use a neutral kneading element as the element of the fifth kneading section.

Any screw element may be used as the other elements to constitute the screw 3 unless the overall ability to convey a molten resin composition.

[Resin (A)]

Examples of the resin (A) include liquid crystalline polyesters, polyphenylene sulfides, polyethersulfones, polyamides, and polyimides. Particularly, liquid crystalline polyesters are preferred.

Such liquid crystalline polyesters are liquid crystalline polyesters that will exhibit liquid crystallinity in a molten state, and preferred are those which melt at temperatures not higher than 450° C. Such a liquid crystalline polyesters may be a liquid crystalline polyesteramide, a liquid crystalline polyesterether, a liquid crystalline polyestercarbonate, or a liquid crystalline polyesterimide. The liquid crystalline polyester is preferably an all-aromatic, liquid crystalline polyester prepared using only an aromatic compound as a feed monomer.

Typical examples of the liquid crystalline polyester include the following (I) through (IV):

(I) one produced by polymerizing (polycondensing) an aromatic hydroxycarboxylic acid with at least one compound selected from the group consisting of an aromatic dicarboxylic acid, an aromaticdiol, an aromatic hydroxyamine, and an aromatic diamine;

(II) one produced by polymerizing two or more types of aromatic hydroxycarboxylic acids;

(III) one produced by polymerizing an aromatic dicarboxylic acid with at least one compound selected from the group consisting of an aromatic diol, an aromatic hydroxyamine, and an aromatic diamine;

(IV) one produced by polymerizing a polyester such as polyethylene terephthalate with an aromatic hydroxycarboxylic acid.

Here, the aromatic hydroxycarboxylic acid, the aromatic dicarboxylic acid, the aromatic diol, the aromatic hydroxyamine, and the aromatic diamine each independently allow their polymerizable derivatives to be used as a substitute for a part or the whole thereof.

Examples of polymerizable derivatives of compounds having a carboxyl group such as an aromatic hydroxycarboxylic acid and an aromatic dicarboxylic acid include compounds (esters) resulting from the conversion of a carboxyl group into an alkoxycarbonyl group or an aryloxycarbonyl group, compounds (acid halides) resulting from the conversion of a carboxyl group into a haloformyl group, and compounds (acid anhydrides) resulting from the conversion of a carboxyl group into an acyloxycarbonyl group.

Examples of polymerizable derivatives of compounds having a hydroxyl group such as an aromatic hydroxycarboxylic acid, an aromatic diol, and an aromatic hydroxyamine include compounds (acylated bodies) resulting from the conversion of a hydroxyl group into an acyloxyl group by acylation.

Examples of polymerizable derivatives of compounds having an amino group such as an aromatic hydroxyamine and an aromatic diamine include compounds (acylated bodies) resulting from the conversion of an amino group into an acylamino group by acylation.

Preferably, a liquid crystalline polyester has a repeating unit represented by the following formula (1) (hereinafter sometimes described as a "repeating unit (1)"), and more preferably, it has a repeating unit (1), a repeating unit represented by the following formula (2) (hereinafter sometimes described as a "repeating unit (2)"), and a repeating unit represented by the following formula (3) (hereinafter sometimes described as a "repeating unit (3)"):

$$—O—Ar^1—CO— \quad (1)$$

$$—CO—Ar^2—CO— \quad (2)$$

$$—X—Ar^3—Y— \quad (3)$$

wherein $Ar^1$ represents a phenylene group, a naphthylene group, or a biphenylylene group; $Ar^2$ and $Ar^3$ each independently represent a phenylene group, a naphthylene group, a biphenylylene group, or a group represented by the following formula (4); X and Y each independently represent an oxygen atom or an imino group (—NH—); and one or more hydrogen atoms in $Ar^1$, $Ar^2$, and $Ar^3$ may each independently be substituted by a halogen atom, an alkyl group, or an aryl group,

$$—Ar^4—Z—Ar^5— \quad (4)$$

wherein $Ar^4$ and $Ar^5$ each independently represent a phenylene group or a naphthylene group; and Z represents an oxygen atom, a sulfur atom, a carbonyl group, a sulfonyl group, or an alkylidene group.

Examples of the halogen atom include a fluorine atom, a chlorine atom, a bromine atom, and an iodine atom.

Examples of the alkyl group include a methyl group, an ethyl group, a n-propyl group, an isopropyl group, a n-butyl group, an isobutyl group, a sec-butyl group, a tert-butyl group, a n-pentyl group, a n-hexyl group, a n-heptyl group, a 2-ethylhexyl group, a n-octyl group, a n-nonyl group, and n-decyl group; the number of carbon atoms thereof is preferably 1 to 10.

Examples of the aryl group include a phenyl group, an o-tolyl group, a m-tolyl group, a p-tolyl group, a 1-naphthyl group, and a 2-naphthyl group; the number of carbon atoms thereof is preferably 6 to 20.

When the hydrogen atom has been substituted by such a group, the number thereof is preferably two or less, more preferably one or less for each of the group represented by $Ar^1$, $Ar^2$, or $Ar^3$.

Examples of the alkylidene group include a methylene group, an ethylidene group, an isopropylidene group, a n-butylidene group, and a 2-ethylhexylidene group; the number of carbon atoms thereof is preferably 1 to 10.

The repeating unit (1) is a repeating unit derived from a prescribed aromatic hydroxycarboxylic acid. As the repeating unit (1), one in which $Ar^1$ is a p-phenylene group (a repeating unit derived from p-hydroxybenzoic acid) and one in which $Ar^1$ is a 2,6-naphthylene group (a repeating unit derived from 6-hydroxy-2-naphthoic acid) are preferred.

The repeating unit (2) is a repeating unit derived from a prescribed aromatic dicarboxylic acid. As the repeating unit (2), one in which $Ar^2$ is a p-phenylene group (a repeating unit derived from terephthalic acid), one in which $Ar^2$ is m-phenylene group (a repeating unit derived from isophthalic acid), one in which $Ar^2$ is a 2,6-naphthylene group (a repeating unit derived from 2,6-naphthalenedicarboxylic acid), and one in which $Ar^2$ is a diphenyl ether-4,4'-diyl group (a repeating unit derived from a diphenyl ether-4,4'-dicarboxylic acid) are preferred.

The repeating unit (3) is a repeating unit derived from a prescribed aromatic diol, aromatic hydroxylamine, or aromatic diamine. As the repeating unit (3), one in which $Ar^3$ is a p-phenylene group (a repeating unit derived from hydroquinone, p-aminophenol, or p-phenylenediamine), and one in which $Ar^3$ is a 4,4'-biphenylylene group (a repeating unit derived from 4,4'-dihydroxybiphenyl, 4-amino-4'-hydroxybiphenyl, or 4,4'-diaminobiphenyl) are preferred.

The content of the repeating unit (1) is preferably 30 mol % or more, more preferably 30 to 80 mol %, even more preferably 40 to 70 mol %, and particularly preferably 45 to 65 mol %, relative to the total quantity of all the repeating units constituting the liquid crystalline polyester (i.e., the value determined by calculating, for each of the repeating units constituting the liquid crystalline polyester, the quantity (in mol) equivalent to the amount of substance of a repeating unit by the division of the mass of the repeating unit by the formula weight of the repeating unit, and then summing them).

The content of the repeating unit (2) is preferably 35 mol % or less, more preferably 10 to 35 mol %, even more preferably 15 to 30 mol %, and particularly preferably 17.5 to 27.5 mol %, relative to the total quantity of all the repeating units constituting the liquid crystalline polyester.

The content of the repeating unit (3) is preferably 35 mol % or less, more preferably 10 to 35 mol %, even more preferably 15 to 30 mol %, and particularly preferably 17.5 to 27.5 mol %, relative to the total quantity of all the repeating units constituting the liquid crystalline polyester.

The larger the content of the repeating unit (1), the more likely the melt flowability, the heat resistance, and the strength/rigidity are improved; however, if it is excessively large, the melting temperature and the melt viscosity easily become high and temperature necessary for shaping easily becomes high.

The ratio of the content of the repeating unit (2) to the content of the repeating unit (3), expressed by [the content of the repeating unit (2)]/[the content of the repeating unit (3)] (mol/mol), is preferably from 0.9/1 to 1/0.9, more preferably from 0.95/1 to 1/0.95, and even more preferably from 0.98/1 to 1/0.98.

As to each of the repeating units (1) to (3), the liquid crystalline polyester may have two or more types of repeating units. Although the liquid crystalline polyester may having a repeating unit other than the repeating units (1) to (3), the content thereof is preferably up to 10 mol %, and more preferably up to 5 mol %, relative to the total quantity of all the repeating units constituting the liquid crystalline polyester.

The liquid crystalline polyester preferably has, as the repeating unit (3), a repeating unit in which X and Y are oxygen atoms, i.e., a repeating unit derived from a prescribed aromatic diol, and it preferably has only a repeating unit in which X and Y are oxygen atoms as the repeating unit (3). Such configuration readily allows a liquid crystalline polyester to exhibit a low melt viscosity.

Preferably, a liquid crystalline polyester is produced by causing feed monomers corresponding to repeating units that constitute the polyester to undergo melt polymerization and then causing the resulting polymer (hereinafter sometimes described as a "prepolymer") to undergo solid phase polymerization. A high molecular weight liquid crystalline polyester that is high in heat resistance and strength/rigidity can thereby be produced with sufficient operativity. The melt polymerization may be carried out in the presence of a catalyst; examples of the catalyst to be used in such a case include metal compounds such as magnesium acetate, stannous acetate, tetrabutyl titanate, lead acetate, sodium acetate, potassium acetate, and antimony trioxide, and nitrogen-containing heterocyclic compounds such as 4-(dimethylamino)pyridine and 1-methylimidazole.

The flow onset temperature of the liquid crystalline polyester is preferably 270° C. or higher, more preferably 270 to 400° C., and even more preferably 280 to 380° C. The higher the flow onset temperature, the more likely the heat resistance and the strength/rigidity are improved; however, if the flow onset temperature is excessively high, the melting temperature and the melt viscosity easily become high and temperature necessary for shaping easily becomes high.

The flow onset temperature is also called a flow temperature and that is a temperature at which a liquid crystalline polyester exhibits a viscosity of 4800 Pa·s (48000 Poise) when being molten by increasing the temperature thereof at a rate of 4° C./rain under a load of 9.8 MPa (100 kg/cm$^2$) by using a capillary rheometer and then extruded through a nozzle being 1 mm in inner diameter and 10 mm in length. The flow onset temperature can be used as a measure of the molecular weight of a liquid crystalline polyester (see "Liquid Crystalline Polymer—Synthesis, Molding, and Application—" edited by Naoyuki Koide, p. 95, CMC, published on Jun. 5, 1987).

(Fibrous Filler)

The fibrous filler (B) to be used for the production method of the present embodiment maybe either a fibrous inorganic filler or a fibrous organic filler.

Examples of the fibrous inorganic filler include glass fibers; carbon fibers, such as. PAN-type carbon fiber and pitch-based carbon fiber; ceramic fibers, such as silica fiber, alumina fiber, and silica alumina fiber; metal fibers, such as stainless steel fiber; and basalt fiber. Further examples include whiskers such as potassium titanate whisker, barium titanate whisker, wollastonite whisker, aluminum borate whisker, silicon nitride whisker, and silicon carbide whisker.

Examples of the fibrous organic filler include polyester fibers and aramid fibers.

In view of the wear load to be applied to an apparatus in molding processing and the availability, a fibrous inorganic filler selected from the group consisting of glass fiber, carbon fiber, basalt fiber, and alumina fiber is preferred as the fibrous filler (B), and especially, glass fiber is more preferred.

The fibrous filler (B) may be a mixture of two or more species of the aforementioned fillers. It may also be a mixture of a fibrous filler and the other filler. The loading of the filler is usually 0 to 100 parts by mass relative to 100 parts by mass of the liquid crystalline polyester.

The fibrous filler (B) may have been subjected to surface coating treatment for the purpose of reducing the generation of gas from a resin molded article to be obtained using a resin composition obtained by the production method of this embodiment and thereby increasing the chemical stability of the resin molded article and from the viewpoint that in producing electric and electronic devices and optical devices, peripheral components are less polluted by generated gas. Examples of such surface coating treatment include surface coating treatment with a coupling agent, such as a titanium coupling agent, and surface coating treatment with various types of thermosetting resins and thermoplastic resins.

The glass fiber that is a fibrous filler (B) may be one having been treated with an epoxy-based, urethane-based, or acrylic coating or sizing agent.

The weight average fiber length of the fibrous filler (B) is adjusted to 1 mm or more, and it is preferably 1 mm to 10 mm, and more preferably 2 to 10 mm. Preferably, the average diameter of the fibrous filler (B) is 3 to 15 μm. If the average diameter of the fibrous filler (B) is smaller than 3 μm, the effect as a reinforcement tends to be reduced. If the average diameter of the fibrous filler (B) exceeds 15 μm, there is a tendency that moldability lowers and the appearance of a surface deteriorates. Preferably, the fibrous filler (B) is chopped strands uniform in length without distribution.

Next, as one embodiment of the method for producing a resin composition of the above embodiment, there will be described a case where a resin composition is prepared by melt-kneading a resin (A) and a fibrous filler (B), followed by extrusion, by using an extruder 10 illustrated in FIG. 1.

In this embodiment of the method for producing a resin composition, (i) a part (X1) of the resin (A) and a part (Y1) of the fibrous filler (B) having a weight average fiber length of 1 mm or more are fed through the main feed port 5 of the extruder 10, and then (ii) the rest (X2) of the resin (A) and the rest (Y2) of the fibrous filler (B) having a weight average fiber length of 1 mm or more are fed through the side feed port 7 of the extruder 10.

Herein, the total feed of the resin (A) to the extruder 10, (P)=X1+X2 (% by weight), the total feed of the fibrous filler (B) to the extruder 10, (Q)=Y1+Y2 (% by weight), and the sum total of the feed of the resin (A) and the feed of the fibrous filler (B), (P+Q), is 100% by weight.

The weight proportions of the resin (A) and the fibrous filler (B) in the resin composition to be obtained (that is, the proportions of the feeds of the resin (A) and the fibrous filler (B) to be fed to the extruder 10) are preferably 55 to 85% by weight of the resin (A) and 45 to 20% by weight of the fibrous fillers (B), and more preferably 60 to 70% by weight of (A) and 40 to 30% by weight of (B) (herein the sum total of the resin (A) and the fibrous filler (B) is 100% by weight). If the proportion of the fibrous filler (B) in a resin composition is excessively high, the flowability of the resin composition is deteriorated when molding is performed using the resin composition and therefore it becomes difficult to perform molding Conversely, if the proportion of the fibrous filler (B) in a resin composition is excessively low, the effect to reinforce molded articles obtained using the resin composition is reduced, resulting in a lack of rigidity.

In the present invention, it is preferable to feed a part (X1) of the resin (A) and a part (Y1) of the fibrous filler (B) through the main feed port 5 of the extruder 10 and feed the rest (X2) of the resin (A) and the rest (Y2) of the fibrous filler (B) through the side feed port 7 provided rearwards in the extrusion direction from the main feed port 5 so that the ratio X1/X2 will be from 55/45 to 70/30% by weight ratio, and the ratio Y1/Y2 will be from 75/25 to 25/75% by weight ratio. More preferably, they are fed so that X2/Y2=90/10 to 45/55% by weight ratio.

If the amount (Y1) of the fibrous filler (B) to be fed to the main feed port 5 is larger than the above-mentioned range, the load to the extruder 10 may become excessively large. Conversely, if the amount (Y1) of the fibrous filler (B) to be fed to the main feed port 5 is excessively smaller than that range, there is a possibility that the average fiber length of the fibrous filler in the resin composition obtained becomes long, so that the flowability of the resin composition in the case where molding is performed using the resin composition may be impaired. If the ratio of the amount (X2) of the resin (A) to the amount (Y2) of the fibrous filler (B) to be fed through the side feed port 7 is out of that range, there is a possibility that the average fiber length of the fibrous filler in the resin composition obtained becomes long, so that the flowability of the resin composition in the case where molding is performed using the resin composition may be impaired.

At both the main feed port 5 and the side feed port 7, it is preferable to feed the resin (A) and the fibrous filler (B) simultaneously.

In the method for producing a resin composition of this embodiment, it is preferable to perform kneading while adjusting the temperature of the cylinder 2 of the extruder 10 to be a temperature at which the resin (A) melts (from 400° C. to 340° C.). In order to suppress the overheating of the molten resin caused by shear heating, the temperature of the cylinder 2 may be lowered by up to 120° C. from a melting temperature (from 400° C. to 340° C.) of the resin (A) only in parts having shear heating on a downstream side from the side feeder 7. Namely, the temperature of the cylinder 2 may be in a range between from 400° C. to 220° C. only in parts having shear heating on a downstream side from the side feeder 7.

The discharge of a resin composition (a mixture of the resin (A) and the fibrous filler (B)) through the outlet die 9 of the extruder 10 is preferably adjusted to 200 kg/hr to 400 kg/hr. Preferably, the revolution speed of the screw 3 of the extruder 10 is adjusted to 500 to 800 rpm. Such production conditions are preferably adjusted so that the torque may become 60% or more.

A resin composition can be produced by feeding the resin (A) and the fibrous filler (B) to the extruder 10, melt-kneading them, and performing extrusion under the conditions described above. Preferably, the resulting resin composition is shaped into a pellet form after being extruded from the extruder 10.

The weight average fiber length of the fibrous filler in the resulting resin composition is 150 to 350 μm, preferably 200 to 300 μm, more preferably 200 to 280 μm. The number average fiber length of the fibrous filler in the resulting resin composition is 100 to 220 μm, preferably 100 to 210 μm, more preferably 120 to 200 μm.

If the fiber length of the fibrous filler in a resin composition is shorter than the above ranges, there is a possibility that the rigidity of a molded article obtained using the resin composition becomes insufficient and comes to have increased anisotropy. Conversely, if the fiber length of the fibrous filler in a resin composition is longer than the above ranges, there is a possibility that when a molded article is produced using the resin composition, the flowability of the resin composition is deteriorated and the moldability is impaired. Moreover, if the fiber length of the fibrous filler in a resin composition is longer than the above ranges, there is a possibility that the surface of a molded article obtained using the resin composition is damaged and dustiness due to the falling off of the fibrous filler or the generation of a resin dust derived therefrom is deteriorated.

The method for measuring the fiber length of a fibrous filler is described below.

[Method for Measuring Fiber Length of Fibrous Filler]

The weight average fiber length and the number average fiber length of a fibrous filler are determined from the shape of the fibrous filler contained in a resin composition. The method for the measurement thereof is described concretely below.

The shape of the fibrous filler is determined by taking 1.0 g of the resin composition into a crucible, treating it at 600° C. for 4 hours within an electric furnace, thereby ashing it, dispersing the residue in methanol and taking a microscopic photograph with the dispersion spread on a slide glass, detecting the shape of the fibrous filler directly from the photograph, and calculating the average thereof. In the calculation of the average, a population parameter of 400 or more is used. As to each weight, a weight corresponding to each fiber length is calculated from the specific gravity of the fibrous filler and the overall weight of the sample used is used in the calculation of the average.

The method for producing the resin composition of the present invention is configured to feed part of the resin (A) and part of a fibrous filler (B) having a weight-average fiber length of not less than 1 mm through the main feed port 5 of the extruder 10 and feed the rest of the resin (A) and the rest of the fibrous filler (B) having a weight-average fiber length of not less than 1 mm through the side feed port 7 provided rearwards from the main feed port 5 in the extrusion direction.

For this reason, since the fibrous filler (B) fed through the main feed port 5 is kneaded at the first kneading section 11, the second kneading section 12, and the third kneading section 13 three times in total, the fiber length becomes shorter as compared with the case where the fiber is fed only at the side feed port 7. If the fourth kneading section is added to the first vent 4 and the fifth kneading section is added to the second vent 6, the effect of fiber length control is enhanced. Moreover, since the fibrous filler (B) fed through the main feed port 5 is kneaded with the un-molten hard resin (A) fed simultaneously therewith and thereby is ground mutually, the fiber length is further reduced. Thus, by the production method of the present invention, a resin composition with a specific weight average fiber length and additionally a specific fiber length distribution can be produced.

The production method of the present invention makes it possible to control the number average fiber length in a resin composition to be obtained to 100 to 220 μm and also control the weight average fiber length to 150 to 350 μm.

Moreover, by the production method of the present invention, a resin composition in which the fiber length of the fibrous filler contained therein is controlled well can be produced economically because the fibrous fiber is not required to be classified into a desired fiber length before being fed into the extruder 10.

Although in the embodiment described above was described the case where the resin composition melt-kneaded by using the extruder contains only the resin (A) and the fibrous filler (B), the present invention is not be limited to this example and one or more other components, such as additives and resins other than liquid crystalline polyesters, may be further blended into the resin composition to be melt-kneaded by using the extruder. Such other components as additives and resins other than liquid crystalline polyesters may be fed into the cylinder 2 through the main feed port 5 and/or the side feed port 7 according to need.

Examples of additives which the resin composition to be melt-kneaded using an extruder may contain include antioxidants, heat stabilizers, UV absorbers, antistatic agents, surfactants, flame retardants, and coloring agents. The loading of such an additive is preferably 0 to 5 parts by mass relative to 100 parts by mass of the liquid crystalline polyester.

Examples of resins other than liquid crystalline polyesters that the resin composition to be melt-kneaded using an extruder may contain include thermoplastic resins other than liquid crystalline polyesters, such as polypropylenes, polyamides, polyesters other than liquid crystalline polyesters, polysulfones, polyphenylene sulfides, polyether ketones, polycarbonates, polyphenylene ethers and polyether imides; and thermosetting resins, such as phenol resins, epoxy resins, polyimide resins, and cyanate resins. The loading of such a resin other than liquid crystalline polyesters is preferably 0 to 99 parts by mass relative to 100 parts by mass of the liquid crystalline polyester.

A wide variety of molded articles can be obtained by molding resin compositions obtained by the production method of the present invention. Examples of such molded articles include electric and electronic components and optical components, and specific examples thereof include components associated with semiconductor production process, such as connectors, sockets, relay components, coil bobbins optical pickups, oscillators, printed wiring boards, circuit boards, semiconductor packages, components associated with computers, lens tubes of cameras, optical sensor housings, compact camera module housings (packages and lens tubes), projector optical engine constitutional elements, IC trays, and wafer carriers; home electric appliance components such as VTR, televisions, irons, air conditioners, stereos, vacuum cleaners, refrigerators, rice cookers, and lighting equipments; lighting equipment components such as lamp reflectors and lamp holders; acoustic product components such as compact discs, laser discs, and speakers; and communication equipment components such as ferrules for optical cables, telephone components, facsimile components, and modems.

Moreover, examples of applications other than the above include copying machine and components associated with printers such as separating claws and heater holders; machine components such as impellers, fan gears, gears, bearings, motor components and cases; automobile components such as mechanical components for automobiles, engine components, components in engine rooms, illumination components, and interior components; cooking equipments such as microwave pans for cooking and heat resisting tableware; heat insulating and acoustic insulating materials such as floor covering materials and wall materials, supporting materials such as beams and posts, construction materials such as roofing materials, or materials for civil engineering and construction; components for aircrafts, spacecrafts, space appliances; members for radiation facilities such as nuclear reactors; members for marine facilities; jigs for cleaning; components for optical instruments; valves; pipes; nozzles; filters; films; medical equipment components and medical materials; components for sensors; sanitary items; sporting goods; and leisure goods.

As the molding method to be used when a molded article is produced from a resin composition obtained by the present invention, preferred is a melt-molding method, examples of which include an injection molding method, an extrusion forming method such as a T-shaped die method and a tubular film forming method, a compression molding method, a blow molding method, a vacuum molding method, and a press forming method. Especially, an injection molding method is preferred.

Molded articles using resin compositions obtained by the production method of the present invention are excellent in mechanical strength, heat resistance, and moldability and have an anti-dusting property.

EXAMPLES

The present invention is illustrated in more detail with reference to the following specific examples. However, the present invention is not limited to the following examples.

Referential Example 1

Production of Liquid Crystal Polyester

A reactor vessel equipped with a stirrer, a torque meter, a nitrogen gas inlet, a thermometer, and a reflux condenser was charged with 994.5 g (7.2 mol) of p-hydroxybenzoic acid, 299.0 g (1.8 mol) of terephthalic acid, 99.7 g (0.6 mol) of isophthalic acid, 446.9 g (2.4 mol) of 4,4'-dihydroxybiphenyl, 1347.6 g (13.2 mol) of acetic anhydride, and 0.194 g of 1-methylimidazole, and then the temperature was raised from room temperature to 145° C. over 15 minutes under stirring under a nitrogen gas flow, followed by refluxing at 145° C. for 1 hour. Subsequently, 0.194 g of 1-methylimidazole was added, and then the temperature was raised from 145° C. to 320° C. over 3 hours while by-produced acetic acid and unreacted acetic acid were distilled off. After the temperature was kept at 320° C. for 2 hours, the contents were taken out of the reactor and cooled to room temperature. The resulting solid was pulverized with a pulverizer, whereby a powdery prepolymer was obtained. The flow onset temperature of this prepolymer was 261° C. Subsequently, the prepolymer was heated from room temperature to 250° C. over one hour under a nitrogen gas atmosphere, and then the temperature was raised from 250° C. to 285° C. over 5 hours and kept at 285° C. for 3 hours, whereby solid phase polymerization was carried out. Then, the mixture was cooled, so that a powdery liquid crystalline polyester was obtained. The flow onset temperature of this liquid crystalline polyester was 327° C. The thus-obtained liquid crystalline polyester was named LCP1.

Examples 1 to 3, Comparative Examples 1 to 3

A resin composition was prepared by melt-kneading LCP1 obtained above and glass fiber (CS-3J-260S produced by Nitto Boseki Co., Ltd.) in the distribution of LCP1 (X1, X2) and the glass fiber (Y1, Y2) given in Table 1 by using a twin-screw extruder (TEM-41SS manufactured by Toshiba Machine Co., Ltd.).

As the twin-screw extruder, there was used one having a configuration in which a fourth kneading section was added to the first vent and a fifth kneading section was added to the second vent section in an extruder with the configuration illustrated in FIG. 1. The kneading sections of the twin-screw extruder was configured so that the first kneading section through the fourth kneading section were configured of 5R and 5N and the fifth kneading section was configured of only 5N. N means a neutral kneading segment composed of five pieces staggered at 90 degrees and R means a segment composed of five pieces staggered clockwise at 30 degrees. The second kneading section through the fifth kneading section were adjusted to 240° C. in order to suppress shear heating. The other was adjusted to 340° C. The screw diameter used was 41 mm and the second vent was held with a tap aspirator so that the degree of vacuum would be −0.09 MPa in gage pressure (the atmospheric pressure is considered to be 0 MPa). The screw used was a twin co-rotating (rotating clockwise) and the revolution speed of the screw was adjusted to 700 rpm and extrusion was performed at a rate of 300 kg/hr.

The fiber length of the fibrous filler (glass fiber) in the resulting resin composition was measured by the following method. The results are shown in Table 2.

<Measurement of Weight Average Fiber Length and Number Mean Fiber Length of Fibrous Filler in Resin Composition>

1.0 g of the resin composition obtained was taken into a crucible and treated at 600° C. for 4 hours within an electric furnace, thereby ashing. The residue was dispersed in methanol and a microscopic photograph was taken with the dispersion spread on a slide glass. The shape of the fibrous filler was detected directly from the photograph, and the average thereof was calculated. In the calculation of the average, a population parameter of 400 or more was used. As to each weight, a weight corresponding to each fiber length was calculated from the specific gravity of the fibrous filler and the overall weight of the sample used was used in the calculation of the average.

TABLE 1

|  | Main feed port | | Side feed port | |
| --- | --- | --- | --- | --- |
|  | (X1)/% by weight LCP1 | (Y1)/% by weight Glass fiber | (X2)/% by weight LCP1 | (Y2)/% by weight Glass fiber |
| Comparative Example 1 | 60 | 0 | 0 | 40 |
| Comparative | 50 | 0 | 10 | 40 |

TABLE 1-continued

| | Main feed port | | Side feed port | |
|---|---|---|---|---|
| | (X1)/% by weight LCP1 | (Y1)/% by weight Glass fiber | (X2)/% by weight LCP1 | (Y2)/% by weight Glass fiber |
| Comparative Example 2 | | | | |
| Comparative Example 3 | 35 | 0 | 25 | 40 |
| Example 1 | 35 | 10 | 25 | 30 |
| Example 2 | 35 | 15 | 25 | 25 |
| Example 3 | 31 | 15 | 29 | 25 |

TABLE 2

| | Fiber length (μm) | |
|---|---|---|
| | Weight average | Number average |
| Comparative Example 1 | 495 | 330 |
| Comparative Example 2 | 430 | 280 |
| Comparative Example 3 | 360 | 230 |
| Example 1 | 320 | 205 |
| Example 2 | 270 | 175 |
| Example 3 | 265 | 168 |

From the results shown in Table 2, it was confirmed that the number average fiber length of a fibrous filler in a resin composition could be controlled to 100 to 220 μm and the weight average fiber length can be controlled to 150 to 350 μm in Examples 1 to 3, which are each a production method of the present invention.

The present invention can be used for various types of molded articles including electric and electronic components, optical components, components associated with semiconductor production process, home electric appliance components, lighting equipment components, acoustic product components, communication equipment components, components associated with printers, automobile components, cooking equipments, materials for civil engineering and construction, components for aircrafts, spacecrafts, and space appliances, medical equipment components, sporting goods, and leisure goods.

What is claimed is:

1. A method for producing a resin composition, the method comprising a step of feeding a resin (A) and a fibrous filler (B) to an extruder, melt-kneading and then extruding the resin (A) and the fibrous filler (B), wherein in the extruder comprises a cylinder, a screw mounted within the cylinder, a main feed port provided in the cylinder, and a side feed port provided downstream from the main feed port in the extrusion direction, part of the resin (A) and part of the fibrous filler (B) having a weight-average fiber length of not less than 1 mm are fed through the main feed port and the rest of the resin (A) and the rest of the fibrous filler (B) having a weight-average fiber length of not less than 1 mm are fed through the side feed port, wherein X1/X2=55/45 to 70/30, Y1/Y2=75/25 to 25/75, and X2/Y2=90/10 to 45/55, where the amount of the part of the resin (A) to be fed to the main feed port is represented by X1, the amount of the part of the fibrous filler (B) to be fed to the main feed port is represented by Y1, the amount of the rest of the resin (A) to be fed to the side feed port is represented by X2, the amount of the rest of the fibrous filler (B) to be fed to the side feed port is represented by Y2, and X1+X2+Y1+Y2=100% by weight.

2. The method for producing a resin composition according to claim 1, wherein the amount of the resin (A) fed to the extruder is 80 to 55% by weight and the amount of the fibrous filler (B) fed to the extruder is 20 to 45% by weight where the sum total of the fed amount of the resin (A) and the fed amount of the fibrous filler (B) is considered to be 100% by weight.

3. The method for producing a resin composition according to claim 1, wherein the resin (A) is a liquid crystalline polyester.

4. The method for producing a resin composition according to claim 1, wherein the fibrous filler (B) is an inorganic filler selected from the group consisting of a glass fiber, a carbon fiber, a basalt fiber, and an alumina fiber.

* * * * *